US012217662B2

(12) United States Patent
Son et al.

(10) Patent No.: US 12,217,662 B2
(45) Date of Patent: Feb. 4, 2025

(54) DISPLAY DEVICE

(71) Applicant: Samsung Display Co., LTD., Yongin-si (KR)

(72) Inventors: Minseong Son, Yongin-si (KR); Sunjoon Hwang, Yongin-si (KR); Yunseong Kim, Yongin-si (KR); Boram Shin, Yongin-si (KR); Seung-Kyu Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/585,494

(22) Filed: Feb. 23, 2024

(65) Prior Publication Data

US 2024/0331618 A1 Oct. 3, 2024

(30) Foreign Application Priority Data

Mar. 30, 2023 (KR) ........................ 10-2023-0041776

(51) Int. Cl.
*G09G 3/32* (2016.01)

(52) U.S. Cl.
CPC ........... *G09G 3/32* (2013.01); *G09G 2310/08* (2013.01); *G09G 2330/028* (2013.01)

(58) Field of Classification Search
CPC . G09G 3/32; G09G 2310/08; G09G 2330/028
See application file for complete search history.

(56) References Cited

U.S. PATENT DOCUMENTS

| | | | | |
|---|---|---|---|---|
| 10,629,128 B2 | 4/2020 | Yang et al. | | |
| 11,238,786 B2 | 2/2022 | Byun et al. | | |
| 11,996,027 B2 * | 5/2024 | Zhou | .................... | G09G 3/3233 |
| 2023/0108303 A1 * | 4/2023 | Xie | ...................... | G09G 3/3233 345/690 |
| 2023/0316976 A1 * | 10/2023 | Zhou | .................... | G09G 3/3233 345/212 |
| 2024/0274052 A1 * | 8/2024 | Zhou | .................... | G09G 3/3233 |

FOREIGN PATENT DOCUMENTS

| | | |
|---|---|---|
| KR | 1020210137328 A | 11/2021 |
| KR | 102372054 B1 | 3/2022 |

* cited by examiner

*Primary Examiner* — Michael Pervan

(74) *Attorney, Agent, or Firm* — CANTOR COLBURN LLP

(57) ABSTRACT

A display device includes: a display panel having a first region and a second region defined in the display panel, in which the second region is adjacent to the first region in a first direction. The display panel includes: a first pixel disposed in the first region, a second pixel disposed in the second region, a first bias voltage line electrically connected to the first pixel to transmit a first bias voltage, and a second bias voltage line electrically connected to the second pixel to transmit a second bias voltage. A time point, at which a level of the first bias voltage is changed, differs from a time point at which a level of the second bias voltage is changed, when the display panel operates at a first frame frequency.

20 Claims, 7 Drawing Sheets

DISPLAY DEVICE

This application claims priority to Korean Patent Application No. 10-2023-0041776, filed on Mar. 30, 2023, and all the benefits accruing therefrom under 35 U.S.C. § 119, the content of which in its entirety is herein incorporated by reference.

BACKGROUND

Embodiments of the present disclosure described herein relate to a display device improved in display quality.

An emissive display device among display devices displays an image by using a light emitting diode that generates a light through the recombination of electrons and holes. The emissive display device has a rapid response speed and is driven with lower power consumption. The emissive display device includes pixels connected to data lines and scan lines. Each pixel typically includes a light emitting diode and a circuit unit to control an amount of current flowing through the light emitting diode. The pixel circuit controls a quantity of current flowing from a first driving voltage to a second driving voltage via a light emitting diode, to correspond to a data signal. In this case, light having a specific brightness is emitted to correspond to the quantity of a current flowing through the light emitting diode.

SUMMARY

Embodiments of the present disclosure provide a display device improved in display quality.

According to an embodiment, a display device includes: a display panel having a first region and a second region defined in the display panel, in which the first region is adjacent to the second region in a first direction, the display panel may include a first pixel disposed in the first region, a second pixel disposed in the second region, a first bias voltage line electrically connected to the first pixel to transmit a first bias voltage, and a second bias voltage line electrically connected to the second pixel to transmit a second bias voltage, and a time point, at which a level of the first bias voltage is changed, may differ from a time point at which a level of the second bias voltage is changed, when the display panel operates at a first frame frequency.

According to an embodiment, the display panel may operate a variable frame frequency including the first frame frequency and a second frame frequency higher than the first frame frequency.

According to an embodiment, one frame may include an active period, in which a data voltage is provided to each of the first pixel and the second pixel, and a plurality of blank periods provided consecutively to the active period, when the display panel operates at the first frame frequency.

According to an embodiment, the time point, at which the level of the first bias voltage is changed, may be overlapped with the active period.

According to an embodiment, the time point, at which the level of the second bias voltage is changed, may be overlapped with a boundary between the active period and the plurality of blank periods.

According to an embodiment, the first bias voltage and the second bias voltage may be changed from a first level to a second level different from the first level, at the time point, at which the level of the first bias voltage is changed, and the time point at which the level of the second bias voltage is changed, respectively.

According to an embodiment, a period, in which the first bias voltage has the first level may be temporally in a non-overlap state with a period in which the second bias voltage has the first level.

According to an embodiment, the second level may be higher than the first level.

According to an embodiment, the first level may be higher than the second level.

According to an embodiment, a waveform of the first bias voltage may be substantially the same as a waveform of the second bias voltage.

According to an embodiment, a phase of the first bias voltage may differ from a phase of the second bias voltage.

According to an embodiment, each of the first pixel and the second pixel may include a light emitting element and a pixel circuit connected to the light emitting element. The pixel circuit may include: a first transistor including a gate electrode connected to a first node, a first electrode, and a second electrode connected to a second node; a second transistor connected between a data line and the first electrode of the first transistor, in which an operation of the second transistor is controlled by a write scan signal provided to a write scan line; and a third transistor connected between the first electrode of the first transistor and the first or second bias voltage line, in which an operation of the third transistor is controlled by a bias scan signal provided to a bias scan line connected to a gate electrode of the third transistor. The write scan signal may be activated to be in an active level by X times (X is a positive integer equal to or greater than '1'), and the bias scan signal may be activated to be in an active level by Y times (Y is a positive integer equal to or greater than '2') greater than the X times.

According to an embodiment, the pixel circuit may further include: a fourth transistor connected between the first node and the second node, in which an operation of the fourth transistor is controlled by a compensation scan signal provided to a compensation scan line; a fifth transistor connected between the first node and a first initialization voltage line for providing a first initialization voltage, in which an operation of the fifth transistor is controlled by an initialization scan signal provided to an initialization scan line; a sixth transistor connected between the first electrode of the first transistor and a first driving voltage line for providing a first driving voltage, in which an operation of the sixth transistor is controlled by a light emitting control signal provided to a light emitting control line; a seventh transistor connected between the second electrode of the first transistor and the light emitting element, in which an operation of the seventh transistor is controlled by the light emitting control signal provided to the light emitting control line; and an eighth transistor connected between the light emitting element and a second initialization voltage line for providing a second initialization voltage, in which an operation of the eighth transistor is controlled by the bias scan signal provided to the bias scan line.

According to an embodiment, each of the first transistor, the second transistor, the third transistor, the sixth transistor, the seventh transistor, and the eighth transistor may be a P-type thin film transistor having a silicon semiconductor layer, and each of the fourth transistor and the fifth transistor may be an N-type thin film transistors having an oxide semiconductor layer.

According to an embodiment, a display device includes: a display panel to operate at a variable frame frequency including a first frame frequency and a second frame frequency higher than the first frame frequency, and including a plurality of first pixels electrically connected to a first bias voltage line and a plurality of second pixels electrically connected to a second bias voltage line; and a voltage generator to provide a first bias voltage to the first bias voltage line and provide a second bias voltage to the second bias voltage line. Each of the plurality of first pixels and second pixels includes: a first transistor including a gate electrode connected to a first node, a first electrode, and a second electrode connected to a second node; a second transistor connected between a data line and the first electrode of the first transistor, in which an operation of the second transistor may be controlled by a write scan signal provided to a write scan line; and a third transistor connected between the first electrode of the first transistor and the first or second bias voltage line, in which an operation of the third transistor may be controlled by a bias scan signal provided to a bias scan line connected to a gate electrode of the third transistor. The write scan signal is activated to be in an active level by X times (X is a positive integer equal to or greater than '1'), and the bias scan signal is activated to be in an active level by Y times (Y is a positive integer equal to or greater than '2') greater than the X times.

According to an embodiment, one frame may include an active period, in which a data voltage is provided to each of the first pixel and the second pixel, and a plurality of blank periods provided consecutively to the active period, when the display panel operates at the first frame frequency, a time point, at which a level of the first bias voltage is changed, may be overlapped with the active period, and a time point, at which a level of the second bias voltage is changed, may be overlapped with a boundary between the active period and the plurality of blank periods.

According to an embodiment, a phase of the first bias voltage may differ from a phase of the second bias voltage.

According to an embodiment, the first bias voltage and the second bias voltage may be changed from a first level to a second level different from the first level, at a time point, at which the level of the first bias voltage is changed, and a time point at which the level of the second bias voltage is changed, respectively.

According to an embodiment, a period, in which the first bias voltage has the first level may be temporally in a non-overlap state with a period in which the second bias voltage has the first level.

According to an embodiment, each of the plurality of first pixels and second pixels may further include a light emitting element and a pixel circuit connected to the light emitting element and including the first to third transistors. The pixel circuit may further include: a fourth transistor connected between the first node and the second node, in which an operation of the fourth transistor is controlled by a compensation scan signal provided to a compensation scan line; a fifth transistor connected between the first node and a first initialization voltage line for providing a first initialization voltage, in which an operation of the fifth transistor is controlled by an initialization scan signal provided to an initialization scan line; a sixth transistor connected between the first electrode of the first transistor and a first driving voltage line for providing a first driving voltage, in which an operation of the sixth transistor is controlled by a light emitting control signal provided to a light emitting control line; a seventh transistor connected between the second electrode of the first transistor and the light emitting element, in which an operation of the seventh transistor is controlled by the light emitting control signal provided to the light emitting control line; and an eighth transistor connected between the light emitting element and a second initialization voltage line for providing a second initialization voltage, in which an operation of the eighth transistor is controlled by the bias scan signal provided to the bias scan line.

BRIEF DESCRIPTION OF THE FIGURES

The above and other aspects and features of the present disclosure will become apparent by describing in detail embodiments thereof with reference to the accompanying drawings.

DETAILED DESCRIPTION

Figure 1:
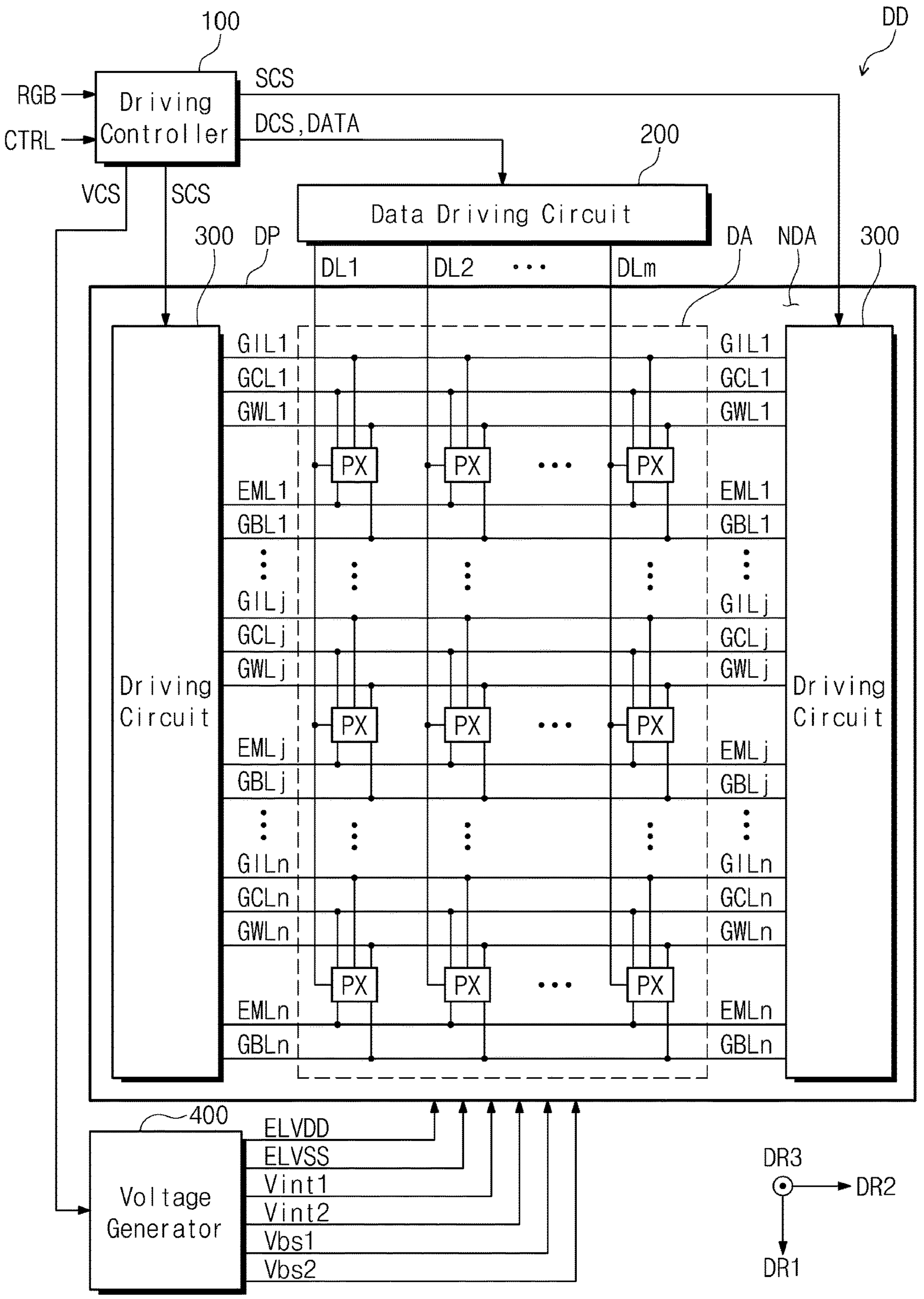
FIG. 1 is a block diagram of a display device according to an embodiment of the present disclosure.

In the specification, the expression that a first component (or region, layer, part, portion, etc.) is "on", "connected with", or "coupled to" a second component means that the first component is directly on, connected with, or coupled to the second component or means that a third component is disposed therebetween.

The same reference numeral refers to the same component. In addition, in drawings, thicknesses, proportions, and dimensions of components may be exaggerated to describe the technical features effectively. The expression "and/or" includes one or more combinations which associated components are capable of defining.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The singular forms are intended to include the plural forms unless the context clearly indicates otherwise.

In addition, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

The terms “part” and “unit” refer to a software component or a hardware component to perform a specific function. The hardware component may include field-programmable gate array (“FPGA”) or an application-specific integrated circuit (“ASIC”). Software components may indicate data used by executable codes and/or executable codes in a storage medium which is able to be addressed. Accordingly, software components may be, for example, object-oriented software components, class components, and task components, and may include processes, functions, properties, procedures, subroutines, program code segments, driver data, firmware, micro-codes, circuits, data, database, data structures, tables, arrangements or variables.

Hereinafter, embodiments of the present disclosure will be described with reference to accompanying drawings.

FIG. 1 is a block diagram of a display device DD according to an embodiment of the present disclosure.

Referring to FIG. 1, the display device DD may include a display panel DP, a driving controller 100, and a panel driver. According to an embodiment of the present disclosure, the panel driver may include a data driving circuit 200 (or a data driver), driving circuits 300, and a voltage generator 400.

The display panel DP may include a display region DA and a non-display region NDA. The display panel DP may include a plurality of pixels PX disposed in the display region DA. Each of the plurality of pixels PX may include a light emitting element ED (see FIG. 3) and a pixel circuit PXC (see FIG. 3) to control a light emitting operation of the light emitting element ED. The pixel circuit PXC may include at least one transistor and at least one capacitor.

The display panel DP further includes initialization scan lines GIL1 to GILn, compensation scan lines GCL1 to GCLn, write scan lines GWL1 to GWLn, bias scan lines GBL1 to GBLn, light emitting control lines EML1 to EMLn, and data lines DL1 to DLm.

The display panel DP may be configured to operate in a first mode in which the display panel DP is driven at a specific operating frequency, for example, 60 Hz, 120 Hz, or 240 Hz, or a second mode in which the display panel DP is driven at a variable operating frequency. In an embodiment, for example, although the variable operating frequency may be variously modified within the range of 1 Hz to 240 Hz, the frequency range is not particularly limited to the above example.

The driving controller 100 receives an image signal RGB and a control signal CTRL. The driving controller 100 generates an image data signal DATA by transforming a data format of the input image signal RGB to be matched to the interface specification of the data driving circuit 200. The driving controller 100 may output a first control signal SCS, a second control signal DCS, and a third control signal VCS.

The data driving circuit 200 receives the second control signal DCS and the image data signal DATA from the driving controller 100. The data driving circuit 200 transforms the image data signal DATA into data signals and outputs the data signals to the data lines DL1 to DLm. The data signals are analog voltages corresponding to a grayscale value of the image data signal DATA. The data lines DL1 to DLm may be arranged in a second direction DR2 and each of the data lines DL1 to DLM may extend in a first direction DR1.

A driving circuit 300 may be disposed in the non-display region NDA of the display panel DP, but the present disclosure is not limited thereto. For another example, at least a portion of the driving circuit 300 may be disposed in the display region DA. The driving circuits 300 may include transistors formed through the same process as that of the pixel circuit PXC (see FIG. 3).

The driving circuit 300 may receive the first control signal SCS and may output a scan signal and a light emitting signal to the initialization scan lines GIL1 to GILn, the compensation scan lines GCL1 to GCLn, the write scan lines GWL1 to GWLn, the bias scan lines GBL1 to GBLn, first light emitting control lines EML11 to EML1n, and second light emitting control lines EML21 to EML2n.

The plurality of driving circuits 300 may be provided. For example, the plurality of driving circuits 300 may be spaced apart from each other while the display region DA is interposed between the plurality of driving circuits 300. The initialization scan lines GIL1 to GILn, the compensation scan lines GCL1 to GCLn, the write scan lines GWL1 to GWLn, the bias scan lines GBL1 to GBLn, and the light emitting control lines EML1 to EMLn may be electrically connected to the driving circuits 300 and may receive signals from the driving circuits 300. In an embodiment, for example, one initialization scan line GIL1, one compensation scan line GCL1, one write scan line GWL1, one bias scan line EBLI, and one light emitting control line EML1 may receive the same signal from two driving circuits 300. However, this is provided only for the illustrative purpose, and one of two driving circuits 300 illustrated in FIG. 1 may be omitted.

Each of the driving circuits 300 may include a scan driving circuit connected to the initialization scan lines GIL1 to GILn, the compensation scan lines GCL1 to GCLn, the write scan lines GWL1 to GWLn, and the bias scan lines GBL1 to GBLn, and a light emitting control driving circuit connected to the light emitting control lines EML1 to EMLn.

Each of the initialization scan lines GIL1 to GILn, the compensation scan lines GCL1 to GCLn, the write scan lines GWL1 to GWLn, the bias scan lines GBL1 to GBLn may extend in the second direction DR2 and may be spaced apart from each other in the first direction DR1.

Each of the plurality of pixels PX may be electrically connected to four scan lines, one light emitting control line, and one data line. For example, as illustrated in FIG. 1, pixels in a first row may be connected to the scan lines GIL1, GCL1, GWL1, and GBL1 and the light emitting control line EML1. For example, pixels in the first column may be connected to the data line DL1. Furthermore, pixels in a j-th row may be connected to the scan lines GILj, GCLj, GWLj, and GBLj and a light emitting control line EMLj.

The voltage generator 400 receives the third control signal VCS and generates voltages for an operation of the display panel DP. According to an embodiment, the voltage generator 400 generates a first driving voltage ELVDD, a second driving voltage ELVSS, a first initialization voltage Vint1, a second initialization voltage Vint2, a first bias voltage Vbs1, and a second bias voltage Vbs2.

According to an embodiment of the present disclosure, the first bias voltage Vbs1, and the second bias voltage Vbs2 may be provided to different regions in the display panel DP. In this case, stains may be prevented from being caused when the operating frequency of the display panel DP is varied. Accordingly, the display quality of the display device DD may be improved. The details thereof will be described below.

Figure 2:
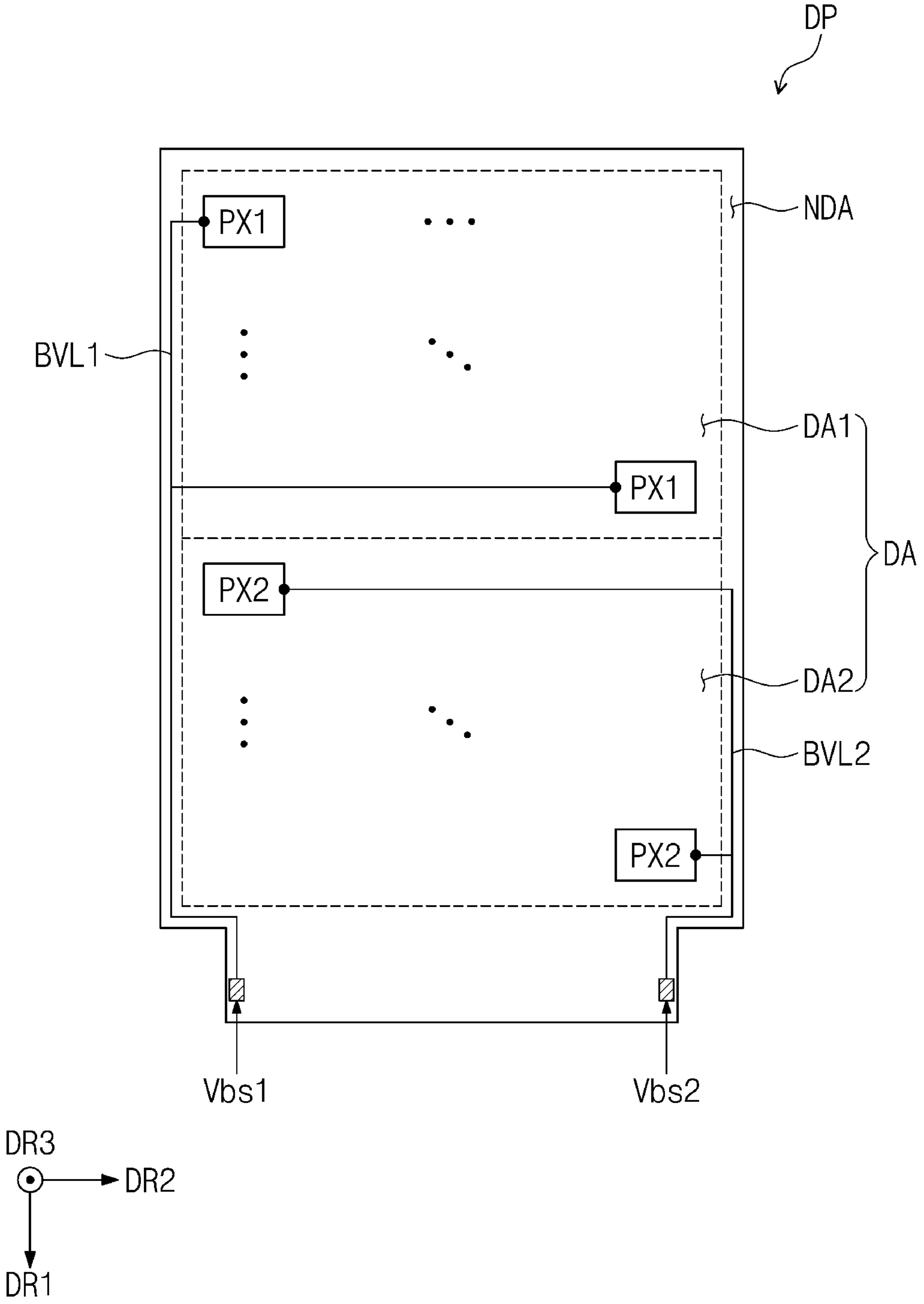
FIG. 2 is a plan view illustrating a display panel according to an embodiment of the present disclosure.

FIG. 2 is a plan view illustrating the display panel DP according to an embodiment of the present disclosure.

Referring to FIGS. 1 and 2, the display region DA of the display panel DP may include a first region DA1 and a second region DA2 adjacent to the first region DA1 in the first direction DR1.

The plurality of pixels PX may include first pixels PX1 disposed in the first region DA1 and second pixels PX2 disposed in the second region DA2. FIG. 2 representatively illustrates two first pixels PX1 and two second pixels PX2.

The first pixels PX1 may be electrically connected to a first bias voltage line BVL1. The second pixels PX2 may be electrically connected to a second bias voltage line BVL2. The first bias voltage line BVL1 and the second bias voltage line BVL2 are electrically isolated from each other to receive mutually different bias voltages. In an embodiment, for example, the first bias voltage line BVL1 may receive the first bias voltage Vbs1, and the second bias voltage line BVL2 may receive the second bias voltage Vbs2.

Although FIG. 2 illustrates that the first bias voltage line BVL1 and the second bias voltage line BVL2 are spaced apart from each other with the display region DA interposed therebetween, the arrangement of the first bias voltage line BVL1 and the second bias voltage line BVL2 is not limited thereto. For another example, the first bias voltage line BVL1 and the second bias voltage line BVL2 may be disposed at the same one side in the display region DA. Alternatively, each of the first bias voltage line BVL1 and the second bias voltage line BVL2 may not be disposed in the non-display region NDA adjacent to the display region DA in the second direction DR2. In other words, the first bias voltage line BVL1 and the second bias voltage line BVL2 may extend in the first direction DR1 from pads toward the display region DA.

The first bias voltage Vbs1 and the second bias voltage Vbs2 may be set to be at a voltage level appropriate to compensate the hysteresis characteristic of a driving transistor (for example, a first transistor T1 (see FIG. 3)) to be described below. In this case, each of the first bias voltage Vbs1 and the second bias voltage Vbs2 may be varied in voltage level at a specific time point.

According to an embodiment of the present disclosure, the stains, for example the brightness difference, between the first region DA1 and the second region DA2 may be removed or minimized by adjusting the phase difference between the first bias voltage Vbs1 and the second bias voltage Vbs2. Accordingly, the display quality of the display device DD may be effectively improved.

Figure 3:
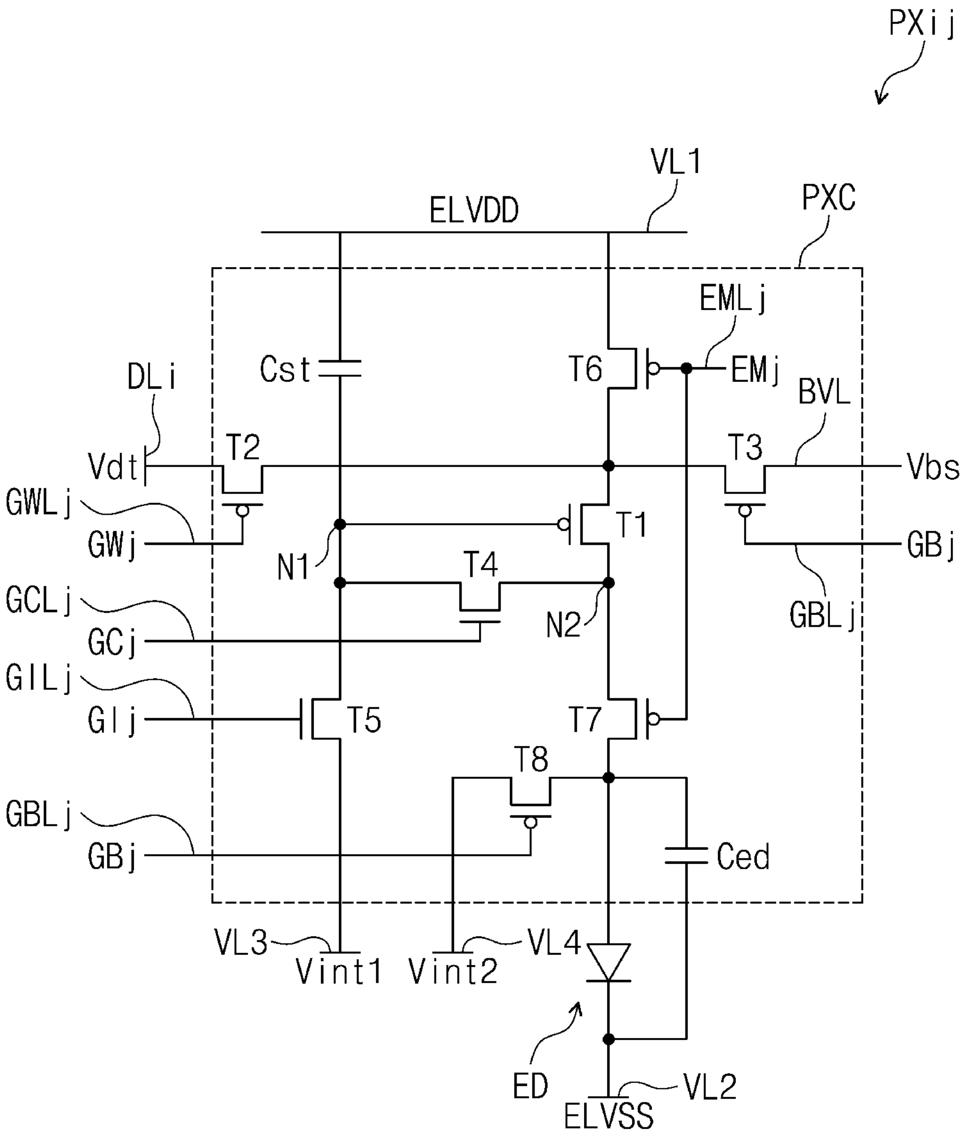
FIG. 3 is a circuit diagram of a pixel according to an embodiment of the present disclosure.

FIG. 3 is a circuit diagram of a pixel PXij according to an embodiment of the present disclosure.

Referring to FIGS. 1, 2, and 3, the pixel PXij may be connected to the j-th initialization scan line GILj, the j-th compensation scan line GCLj, the j-th write scan line GWLj, the j-th bias scan line GBLj, the j-th light emitting control line EMLj, and the i-th data line DLi. Each of the plurality of first pixels PX1 and the plurality of second pixels PX2 illustrated in FIG. 2 may have substantially the same circuit configuration as circuit configuration of the pixel PXij illustrated in FIG. 3.

The pixel PXij according to an embodiment of the present disclosure includes the pixel circuit PXC and at least one light emitting element ED. The pixel circuit PXC may include first to eighth transistors T1, T2, T3, T4, T5, T6, T7, and T8, a first capacitor Cst, and a second capacitor Ced. The pixel PXij illustrated in FIG. 3 is only an example, and the circuit configuration of the pixel PXij may be modified and implemented. In an embodiment, for example, according to an embodiment of the present disclosure, at least one of the first to eighth transistors T1, T2, T3, T4, T5, T6, T7, and T8, the first capacitor Cst, and the second capacitor Ced may be omitted, or an additional transistor or additional capacitor may be further included in the pixel PXij.

According to one embodiment of the present disclosure, each of the first transistor T1, the second transistor T2, the third transistor T3, the sixth transistor T6, the seventh transistor T7, and the eighth transistor T8 may be silicon semiconductor layers, for example, P-type thin film transistors having low-temperature polycrystalline silicon ("LTPS") semiconductor layers. Each of the fourth transistor T4 and the fifth transistor T5 may be N-type thin film transistors having oxide semiconductor layers. However, the present disclosure is not limited thereto. In another embodiment, all of the first to eighth transistors T1, T2, T3, T4, T5, T6, T7, and T8 may be P-type thin film transistors or N-type thin film transistors. Alternatively, some of the first to eighth transistors T1, T2, T3, T4, T5, T6, T7, and T8 may be N-type thin film transistors, and the rest may be P-type transistors.

The j-th initialization scan line GILj may transmit an initialization scan signal GIj, the j-th compensation scan line GCLj may transmit a compensation scan signal GCj, the j-th write scan line GWLj may transmit a write scan signal GWj, the j-th bias scan line GBLj may transmit a bias scan signal GBj (or referred to as an initialization transmission signal), the j-th light emitting control line EMLj may transmit a light emitting control signal EMj, and the i-th data line DLi may transmit a data signal Vdt. The data signal Vdt may have a voltage level corresponding to a grayscale level of the image data signal DATA output from the driving controller 100.

In addition, the pixel PXij may be electrically connected to the plurality of voltage lines VL1, VL2, VL3, VL4, and BVL. In an embodiment, for example, the plurality of voltage lines VL1, VL2, VL3, VL4, and BVL may include the first driving voltage line VL1, the second driving voltage line VL2, the first initialization voltage line VL3, the second initialization voltage line VL4, and the bias voltage line BVL. For example, when the pixel PXij is the first pixel PX1, the bias voltage line BVL may be the first bias voltage line BVL1. When the pixel PXij is the second pixel PX2, the bias voltage line BVL may be the second bias voltage line BVL2.

The first driving voltage line VL1 may transmit the first driving voltage ELVDD to the pixel PXij. The second driving voltage line VL2 may transmit the second driving voltage ELVSS to the pixel PXij. The first initialization voltage line VL3 may transmit the first initialization voltage Vint1 to the pixel PXij. The second initialization voltage line VL4 may transmit the second initialization voltage Vint2 to the pixel PXij. The bias voltage line BVL may transmit the bias voltage Vbs to the pixel PXij. When the pixel PXij is the first pixel PX1, the bias voltage line BVL may transmit the first bias voltage Vbs1 to the pixel PXij as the bias voltage Vbs. When the pixel PXij is the second pixel PX2, the bias voltage line BVL may transmit the second bias voltage Vbs2 to the pixel PXij as the bias voltage Vbs.

The first transistor T1 may include a gate electrode, a first electrode, and a second electrode. In FIG. 3, a node to which the gate electrode of the first transistor T1 is connected may be defined as a first node N1, and a node to which the second electrode of the first transistor T1 is connected may be defined as a second node N2. The first transistor T1 may be referred to as a driving transistor.

The second transistor T2 may be connected between the data line DLi and the first electrode of the first transistor T1. The operation of the second transistor T2 may be controlled by the write scan signal GWj provided to the write scan line GWLj. In other words, the first electrode of the second transistor T2 may be connected to the data line DLi, the second electrode of the second transistor T2 may be connected to the first electrode of the first transistor T1, and the gate electrode of the second transistor T2 may be connected to the write scan line GWLj. The second transistor T2 may be turned on in response to the write scan signal GWj to transmit the data signal Vdt received from the data line DLi to the first electrode of the first transistor T1.

The third transistor T3 may be connected between the first electrode of the first transistor T1 and the bias voltage line BVL. The operation of the third transistor T3 may be controlled by the bias scan signal GBj provided to the bias scan line GBLj. In other words, the first electrode of the third transistor T3 may be connected to the first electrode of the first transistor T1, the second electrode of the third transistor T3 may be connected to the bias voltage line BVL, and the gate electrode of the third transistor T3 may be connected to the bias scan line GBLj.

The fourth transistor T4 may be connected between the first node N1 and the second node N2. The operation of the fourth transistor T4 may be controlled in response to the compensation scan signal GCj provided to the compensation scan line GCLj. In other words, the first electrode of the fourth transistor T4 may be connected to the first transistor N1, the second electrode of the fourth transistor T4 may be connected to the second node N2, and the gate electrode of the fourth transistor T4 may be connected to the compensation scan line GCLj. The fourth transistor T4 may be turned on in response to the compensation scan signal GCj to connect the gate electrode of the first transistor T1 to the second electrode of the first transistor T1.

The first capacitor Cst may be connected between the first node N1 to the first driving voltage line VL1.

The fifth transistor T5 may be electrically connected between the first node N1 and the first initialization voltage line VL3. The operation of the fifth transistor T5 may be controlled in response to the initialization scan signal GIj provided to the initialization scan line GILj. In other words, the first electrode of the fifth transistor T5 may be connected to the first node N1, the second electrode of the fifth transistor T5 may be connected to the first initialization voltage line VL3, and the gate electrode of the fifth transistor T5 may be connected to the initialization scan line GILj. The fifth transistor T5 may be turned on in response to the initialization scan signal GIj to transmit the first initialization voltage Vint1 to the gate electrode of the first transistor T1 and to initialize the voltage of the gate electrode of the first transistor T1.

The sixth transistor T6 may be connected between the first electrode of the first transistor T1 and the first driving voltage line VL1. The seventh transistor T7 may be connected between the second electrode of the first transistor T1 and the light emitting element ED. Each of the sixth transistor T6 and the seventh transistor T7 may be controlled in operation by the light emitting control signal EMj provided to the light emitting control line EMLj. In other words, the first electrode of the sixth transistor T6 may be connected to the first electrode of the first transistor T1, and the second electrode of the sixth transistor T6 may be connected to the first driving voltage line VL1. The first electrode of the seventh transistor T7 may be connected to the second electrode of the first transistor T1, and the second electrode of the seventh transistor T7 may be connected to the light emitting element ED. The gate electrode of the sixth transistor T6 and the gate electrode of the seventh transistor T7 may be connected to the light emitting control line EMLj.

The sixth transistor T6 and the seventh transistor T7 may be turned on in response to the light emitting control signal EMj. As the sixth transistor T6 and the seventh transistor T7 are turned on, a current path may be formed between the first driving voltage line VL1 and the light emitting element ED through the sixth transistor T6, the first transistor T1, and the seventh transistor T7.

The eighth transistor T8 may be connected between the light emitting element ED and the second initialization voltage line VL4. The operation of the eighth transistor T8 may be controlled by the bias scan signal GBj provided to the bias scan line GBLj. In other words, the first electrode of the eighth transistor T8 may be connected to the light emitting element ED, the second electrode of the eighth transistor T8 may be connected to the second initialization voltage line VL4, and the gate electrode of the eighth transistor T8 may be connected to the bias scan line GBLj.

The light emitting element ED may be a light emitting diode. Although one pixel PXij includes one light emitting element ED according to an embodiment by way of example, the present disclosure is not limited thereto. For another example, one pixel PXij may be connected to the plurality of light emitting elements in parallel or in series. The light emitting element ED includes an anode connected to the second electrode of the seventh transistor T7 and a cathode connected to the second driving voltage line VL2.

The second capacitor Ced may be connected to the light emitting element ED in parallel. For example, the first electrode of the second capacitor Ced may be connected to the anode of the light emitting element ED, and the second electrode of the second capacitor Ced may be connected to the cathode of the light emitting element ED.

Figure 4:
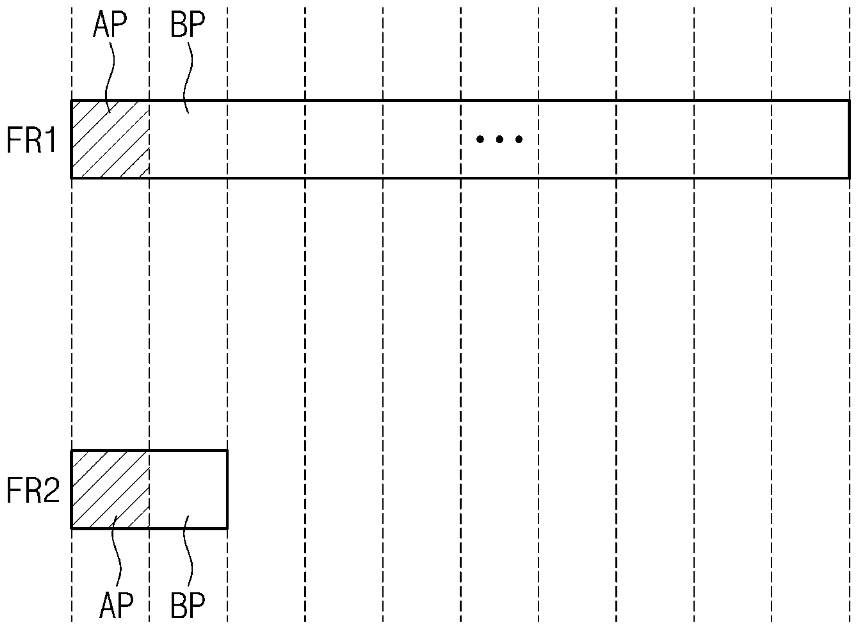
FIG. 4 is a view illustrating cycles included in a first frame and a second frame according to an embodiment of the present disclosure.

FIG. 4 is a view illustrating cycles included in a first frame and a second frame according to an embodiment of the present disclosure.

Referring to FIG. 4, the display panel DP (see FIG. 1) may operate at a variable frame frequency including a first frame frequency and a second frame frequency higher than the first frame frequency. FIG. 4 illustrates a first frame FR1 when the display panel DP operates at the first frame frequency and a second frame FR2 when the display panel DP operates at the second frame frequency.

The first frame frequency may differ from the second frame frequency. For example, the second frame frequency may be higher than the first frame frequency. Accordingly, the duration of the second frame FR2 may be shorter than the duration of the first frame FR1. In an embodiment, for example, the first frame frequency of the first frame FR1 may be 10 Hz, and the second frame frequency of the second frame FR2 may be 60 Hz.

Each of the first frame FR1 and the second frame FR2 may include a plurality of cycles (or periods). The number of blank periods BP included in one frame may be changed depending on a frame frequency of the display panel DP. For example, as the frame frequency is reduced, the number of blank periods BP may be increased. For example, the first frame FR1 may include one active period AP and a plurality of blank periods BP. The second frame FR2 may include one active period AP and one blank period BP. The pixel PXij (see FIG. 3) in the blank period BP may emit light corresponding to data written in the active period AP. The blank period BP may be referred to as a self-scan period.

Figure 5:
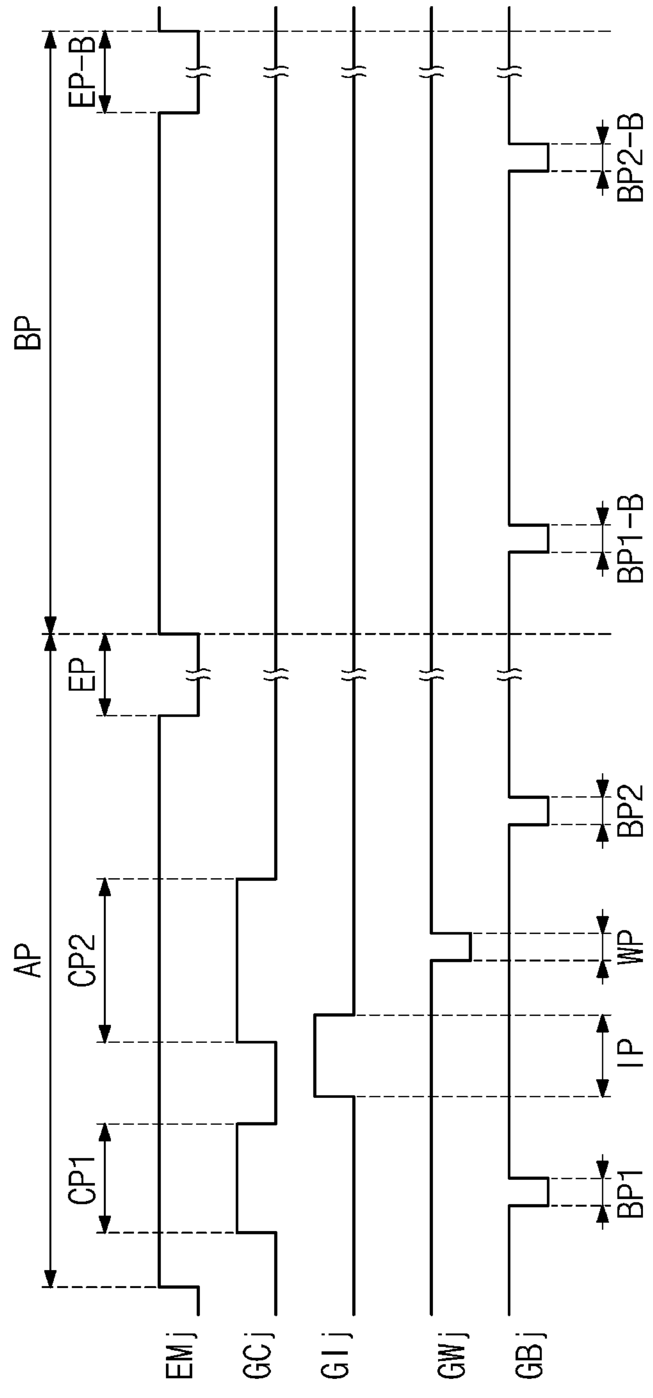
FIG. 5 is a timing diagram illustrating the operation of a pixel according to an embodiment of the present disclosure.

FIG. 5 is a timing diagram illustrating the operation of a pixel according to an embodiment of the present disclosure. FIG. 5 illustrates the scan signals GIj, GCj, GWj, and GBj, and the light emitting control signal EMj provided to the pixel PXij illustrated in FIG. 3 in each of the active period AP and the blank period BP.

Referring to FIGS. 3 and 5, the fourth transistor T4 is turned on when the compensation scan signal GCj in a high level is supplied through the compensation scan line GCLj in a first compensation period CP1 of the active period AP. The first transistor T1 is diode-connected by the fourth transistor T4 which is turned on and biased forward.

When the bias scan signal GBj in a low level is input through the bias scan line GBLj in a first bias period BP1 of the active period AP, the third transistor T3 and the eighth transistor T8 are turned on. As the third transistor T3 is turned on, the first electrode of the first transistor T1 may be initialized to the bias voltage Vbs. As the eighth transistor T8 is turned on, the anode of the light emitting element ED is electrically connected to the second initialization voltage line VL4. The eighth transistor T8 may distribute a portion, which serves as a bypass current, of a current of the first transistor T1 to a current path other than a current path, which is formed at the side of the light emitting element ED. Accordingly, black may be more excellently implemented by the eighth transistor T8, and a contrast ratio of the image displayed on the display panel DP may be improved.

The initialization scan signal GIj in the high level is provided through the initialization scan line GILj in an initialization period IP of the active period AP. When the fifth transistor T5 is turned on in response to the initialization scan signal GIj in the high level, the first initialization voltage Vint1 is transmitted to the gate electrode of the first transistor T1 through the fifth transistor T5 to initialize the first transistor T1.

When the compensation scan signal GCj in a high level is supplied again through the compensation scan line GCLj in a second compensation period CP2 of the active period AP, the fourth transistor T4 is turned on. The first transistor T1 is diode-connected by the fourth transistor T4 turned on and biased forward.

The second transistor T2 is turned on by the write scan signal GWj in a low level in a write period WP of the active period AP overlapped the second compensation period CP2. In the case, a compensation voltage, which is obtained by reducing the voltage of the data signal Vdt provided through the data line DLi by a threshold voltage of the first transistor T1, is applied to the gate electrode of the first transistor T1. In other words, the gate voltage applied to the gate electrode of the first transistor T1 may be the compensation voltage.

As the first driving voltage ELVDD and the compensation voltage are applied to opposite terminals of the first capacitor Cst, respectively, charges corresponding to a difference in voltage between the opposite terminals may be stored in the first capacitor Cst.

When the bias scan signal GBj in the low level is input through the bias scan line GBLj in a second bias period BP2 of the active period AP, the third transistor T3 and the eighth transistor T8 are turned on. As the third transistor T3 is turned on, the first electrode of the first transistor T1 may be initialized to the bias voltage Vbs. As the eighth transistor T8 is turned on, the anode of the light emitting element ED is electrically connected to the second initialization voltage line VL4. The voltage level of the anode of the light emitting element ED may be initialized to the second initialization voltage Vint2.

According to an embodiment of the present disclosure, the write scan signal GWj may be activated to be in an active level by X number of times (X is a positive integer equal to or greater than 1), during one active period AP. The bias scan signal GBj may be activated to be in the active level by Y number of times greater than X number of times (Y is a positive integer of 2 or more). For example, X may be 1', and Y may be '2'.

The active level of the write scan signal GWj may refer to a level for turning on a transistor, for example, the second transistor T2 receiving the write scan signal GWj. Accordingly, the active level of the write scan signal GWj may be in the low level. The active level of the bias scan signal GBj may refer to a level for turning on a transistor, for example, the third transistor T3 and the eighth transistor T8 receiving the bias scan signal GBj. Accordingly, the active level of the bias scan signal GBj may be a low level.

In other words, the operation frequency of the write scan signal GWj may differ from the operation frequency of the bias scan signal GBj. In an embodiment, for example, when the operating frequency of the write scan signal GWj is 120 Hz, the operating frequency of the bias scan signal GBj may be 240 Hz. As the anode of the light emitting element ED is initialized by multiple times during one active period AP, the black of the display panel DP may be more excellently improved, and the contrast ratio of the image displayed on the display panel DP can be improved.

Thereafter, when the light emitting control signal EMj in the low level is input through the light emitting control line EMLj in a light emitting period EP of the active period AP, the sixth transistor T6 and the seventh transistor T7 are turned on. In this case, the driving current is generated by a voltage difference between the gate voltage of the gate electrode of the first transistor T1 and the first driving voltage ELVDD and supplied to the light emitting element ED through the eighth transistor T8, such that the light emitting element ED emits light.

During the blank period BP, each of the compensation scan signal GCj, the initialization scan signal GIj, and the write scan signal GWj may be maintained to be in an inactive level. In an embodiment, for example, during the blank period BP, each of the compensation scan signal GCj and the initialization scan signal GIj may be in a low level, and the write scan signal GWj may be in a high level.

The bias scan signal GBj may be activated to be in an active level (e.g., a low level) during a first bias period BP1-B and a second bias period BP2-B of the blank period BP. While the bias scan signal GBj is in an active level, the third transistor T3 and the eighth transistor T8 are turned on. As the third transistor T3 is turned on, the first electrode of the first transistor T1 may be initialized to the bias voltage Vbs. As the eighth transistor T8 is turned on, the anode of the light emitting element ED may be initialized to the second initialization voltage Vint2. Thereafter, when the light emitting control signal EMj in the low level is input through the light emitting control line EMLj during the light emitting period EP of the active period AP, the sixth transistor T6 and the seventh transistor T7 are turned on. Then, the first transistor T1 provides a current corresponding to a voltage value stored in the first capacitor Cst to the light emitting element ED.

Figure 6:
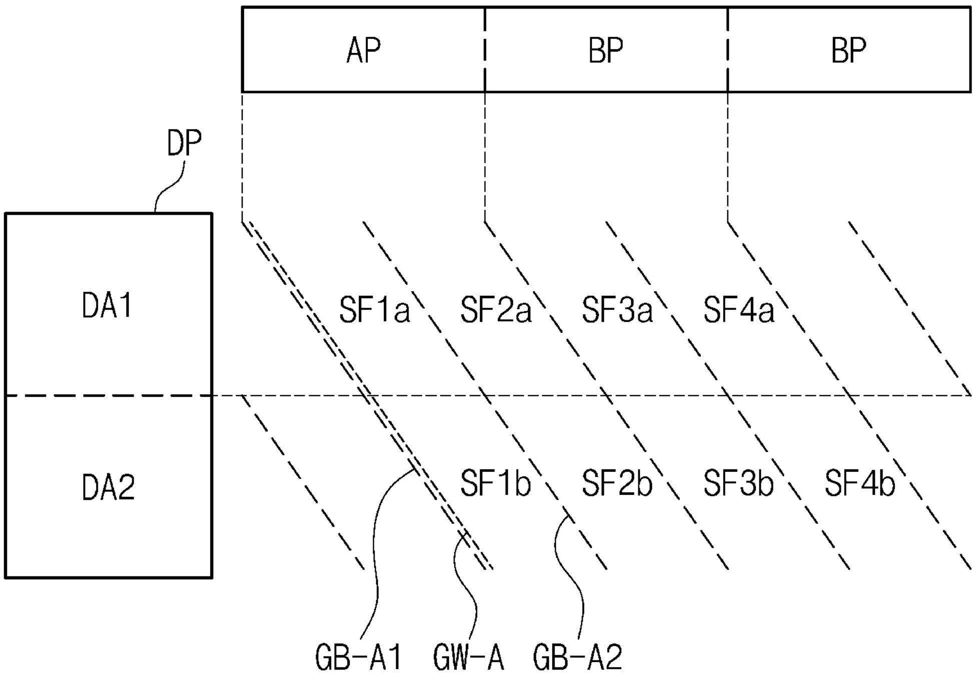
FIG. 6 is a view illustrating the operation of a display panel according to an embodiment of the present disclosure.

FIG. 6 is a view illustrating the operation of a display panel according to an embodiment of the present disclosure.

FIG. 6 illustrates the display panel DP, one active period AP, and two blank periods BP. The one active period AP, and two blank periods BP may indicate a time axis (i.e., horizontal direction), and the display panel DP (i.e., vertical direction) may indicate a position. Scan signals, for example, the write scan signal GWj and the bias scan signal GBj may be sequentially activated from the first region DA1 toward the second region DA2.

Referring to FIGS. 5 and 6, a first bias line GB-A1 illustrated in FIG. 6 may correspond to the first bias period BP1, and a second bias line GB-A2 illustrated in FIG. 6 may correspond to the second bias period BP2. A write line GW-A illustrated in FIG. 6 may correspond to the write period WP. In other words, during one active period AP, the write scan signal GWj may be activated to be in an active level once, and the bias scan signal GBj may be activated to be in the active level twice. During each of the blank periods BP, the write scan signal GWj is not activated, and only the bias scan signal GBj may be activated to be in the active level twice.

Figure 7:
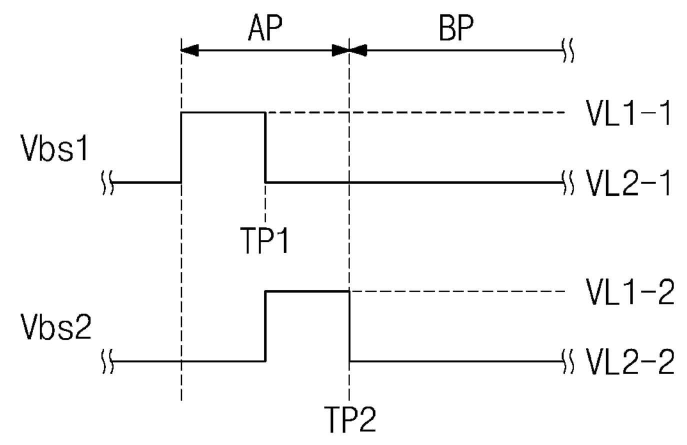
FIG. 7 is a view illustrating waveforms of a first bias voltage and a second bias voltage according to an embodiment of the present disclosure.

FIG. 7 is a view illustrating waveforms of the first bias voltage Vbs1 and the second bias voltage Vbs2 according to an embodiment of the present disclosure.

Referring to FIGS. 6 and 7, the first bias voltage Vbs1 may be provided to the first pixels PX1 (see FIG. 2) disposed in the first region DA1 of the display panel DP, and the second bias voltage Vbs2 may be provided to the second pixels PX2 (see FIG. 2) disposed in the second region DA2.

According to an embodiment of the present disclosure, a waveform of the first bias voltage Vbs1 may be substantially the same as a waveform of the second bias voltage Vbs2. However, the phase of the first bias voltage Vbs1 may differ from the phase of the second bias voltage Vbs2. For example, the second bias voltage Vbs2 may lag the first bias voltage Vbs1 by the phase corresponding to half of the active period AP.

When the display panel DP operates at the first frame frequency, a first level-changing time point TP1, at which the level of the first bias voltage Vbs1 is changed, of the first bias voltage Vbs1 may differ from a second level-changing time point TP2 at which the level of the second bias voltage Vbs2 is changed. In an embodiment, for example, the first bias voltage Vbs1 may be changed from a first level VL1-1 to a second level VL2-1, at the first level-changing time point TP1. The first level VL1-1 may be higher than the second level VL2-1. The second bias voltage Vbs2 may be changed from a first level VL1-2 to a second level VL2-2, at the second level-changing time point TP2. The first level VL1-2 may be higher than the second level VL2-2.

According to an embodiment of the present disclosure, the first level VL1-1 of the first bias voltage Vbs1 may be substantially the same as the first level VL1-2 of the second bias voltage Vbs2. In addition, the second level VL2-1 of the first bias voltage Vbs1 may be substantially the same as the second level VL2-2 of the second bias voltage Vbs2.

According to an embodiment of the present disclosure, each of the first bias voltage Vbs1 and the second bias voltage Vbs2 may have a variable level, instead of a fixed level. Accordingly, the brightness difference and the color difference caused during the active period AP and the blank period BP may be minimized. In other words, as each of the first bias voltage Vbs1 and the second bias voltage Vbs2 may be tuned, even if the display panel DP is driven at the variable frequency, the display panel DP has no change in optical characteristic, or may be minimized in the change of the optical characteristic.

According to an embodiment of the present disclosure, the first level-changing time point TP1 of the first bias voltage Vbs1 may be overlapped with the active period AP, and the second level-changing time point TP2 of the second bias voltage Vbs2 may be overlapped with the boundary between the active period AP and the blank period BP. In addition, the period at which the first bias voltage Vbs1 has the first level VL1-1 may not be temporally overlapped with the period at which the second bias voltage VBs2 has the first level VL1-2.

The active period AP of the first region DA1 may include a first sub-period SF1a and a second sub-period SF2a. The active period AP of the second region DA2 may include a first sub-period SF1b and a second sub-period SF2b. The first blank period BP of the first region DA1 may include a third sub-period SF3a and a fourth sub-period SF4a. The first blank period BP of the second region DA2 may include a third sub-period SF3b and a fourth sub-period SF4b.

The start timing of the first sub-period SF1b of the second region DA2 may lag the start timing of the first sub-period SF1a of the first region DA1 by the half of the active period AP. The start timing of the first sub-period SF1b of the second region DA2 may be substantially the same as the start timing of the second sub-period SF2a of the first region DA1.

When one bias voltage is provided to the first region DA1 and the second region DA2, the difference may be made between bias voltages provided to the first region DA1 and the second region DA2 during the bias periods of the same frame, which differs from an embodiment of the present disclosure. In an embodiment, for example, when the bias voltage is changed between the second sub-period SF2a and the third sub-period SF3a of the first region DA1, the bias voltage before the change of the level is provided to the first pixel provided in the first region DA1 during the second sub-period SF2a, and the bias voltage after the change of the level may be provided to the second pixel disposed in the second region DA2 during the second sub-period SF2b. This may cause stains between the first region DA1 and the second region DA2.

According to an embodiment of the present disclosure, the first bias voltage Vbs1 provided to the first pixels PX1 (see FIG. 2) may differ from the second bias voltage Vbs2 provided to the second pixels PX2 (see FIG. 2) disposed in the second region DA2 (e.g., difference in timing) in the active period AP. That is, the first bias voltage Vbs1 and the second bias voltage Vbs2 may be individually controlled in the active period AP. Therefore, even if the voltage level of the first bias voltage Vbs1 is changed differently compared to the voltage level of the second bias voltage Vbs2, the bias voltages provided to the first region DA1 and the second region DA2 may have a substantially equal level during the bias periods, for example, the first bias period BP1 (see FIG. 5) of the same frame. Therefore, the first electrode of the first transistor T1 of each pixel PX (see FIG. 1) during the bias periods BP of the same frame may be initialized to the bias voltage having an equal level. By these features, the probability of causing the stains between the first region DA1 and the second region DA2 may be removed, and the display quality of the display device DD may be effectively improved.

According to an embodiment of the present disclosure, the first bias voltage Vbs1 having the first level VL1-1 may be provided to the first pixels PX1 of the first region DA1 during the first sub-period SF1a, and the second bias voltage Vbs2 having the first level VL1-2 may be provided to the second pixels PX2 of the second region DA2 during the first sub-period SF1b.

The first bias voltage Vbs1 having the second level VL2-1 may be provided to the first pixels PX1 of the first region DA1 during each of the second sub-period SF2a, the third sub-period SF3a, and the fourth sub-period SF4a. The second bias voltage Vbs2 having the second level VL2-2 may be provided to the second pixels PX2 of the second region DA2 during each of the second sub-period SF2b, the third sub-period SF3b, and the fourth sub-period SF4b. Accordingly, the first bias voltage Vbs1 and the second bias voltage Vbs2 having the second level VL2-1 or VL2-2 are applied to the first region DA1 and the second region DA2, respectively, at the time point at which the blank period BP is started.

Figure 8:
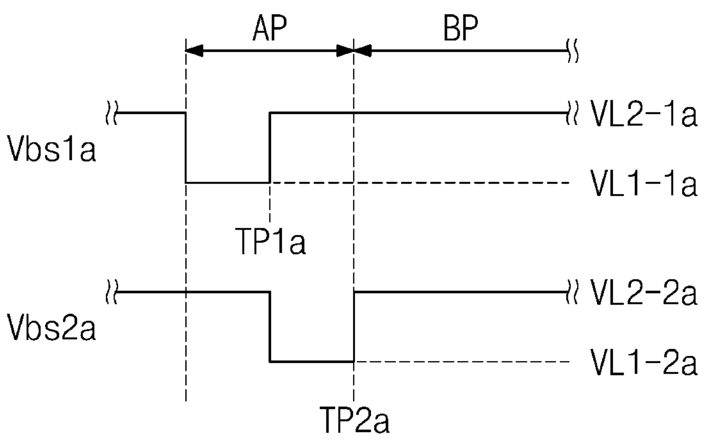
FIG. 8 is a view illustrating waveforms of a first bias voltage and a second bias voltage according to an embodiment of the present disclosure.

FIG. 8 is a view illustrating waveforms of a first bias voltage Vbs1a and a second bias voltage Vbs2a according to an embodiment of the present disclosure. The following description will be made with reference to FIG. 8 while focusing on the difference from the description made with reference to FIG. 7.

Referring to FIGS. 6 and 8, the first bias voltage Vbs1a may be provided to the first pixels PX1 (see FIG. 2) disposed in the first region DA1 of the display panel DP, and the second bias voltage Vbs2a may be provided to the second pixels PX2 (see FIG. 2) disposed in the second region DA2.

When the display panel DP operates at the first frame frequency, a first level-changing time point TP1a, at which the level of the first bias voltage Vbs1a is changed, of the first bias voltage Vbs1 may differ from a second level-changing time point TP2a at which the level of the second bias voltage Vbs2a is changed. In an embodiment, for example, the first bias voltage Vbs1a may be changed from a first level VL1-1a to a second level VL2-1a, at the first level-changing time point TP1a. The second level VL2-1a may be higher than the first level VL1-1a. For example, the second bias voltage Vbs2a may be changed from a first level VL1-2a to a second level VL2-2a, at the second level-changing time point TP2a. The second level VL2-2a may be higher than the second level VL1-2.

According to an embodiment of the present disclosure, the first bias voltage Vbs1a provided to the first pixels PX1 (see FIG. 2) disposed in the first region DA1 and the second bias voltage Vbs2a provided to the second pixels PX2 (see FIG. 2) disposed in the second region DA2 may be different from each other (e.g., difference in timing) in the active period AP. That is, the first bias voltage Vbs1 and the second bias voltage Vbs2 may be individually controlled in the active period AP. Therefore, the levels of the bias voltages provided to the first region DA1 and the second region DA2 may be equal to each other during the bias periods BP of the same frame. Accordingly, the first electrode of the first transistor T1 of each pixel PX (see FIG. 1) during the bias periods BP of the same frame may be initialized to the bias voltage having an equal level regardless whether the pixel PX is the first pixel PX1 in the first region DA1 or the second pixel PX2 in the second region DA2. By these features, the probability of causing the stains between the first region DA1 and the second region DA2 may be removed, and the display quality of the display device DD may be effectively improved.

As described above, the display panel may include the first pixels disposed in the first region and the second pixels disposed in the second region. The first bias voltage line electrically connected to the first pixels to transmit the first bias voltage and the second bias voltage line electrically connected to the second pixels to transmit the second bias voltage may be isolated from each other. Accordingly, even if the voltage level of the first bias voltage is changed, the levels of the bias voltages provided to the first region and the second region may be substantially equal to each other during the bias periods of the same frame. Accordingly, the first electrodes of the first transistors may be initialized to have the bias voltage having an equal level during the bias periods of the same frame. In other words, the probability of causing the stain between the first region and the second region may be removed, and the display quality of the display device may be effectively improved.

Although an embodiment of the present disclosure has been described for illustrative purposes, those skilled in the art will appreciate that various modifications, and substitutions are possible, without departing from the scope and spirit of the invention as disclosed in the accompanying claims. Accordingly, the technical scope of the invention is not limited to the detailed description of this specification, but should be defined by the claims.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a display panel having a first region and a second region defined in the display panel, wherein the first region is adjacent to the second region in a certain direction, wherein the display panel includes:

a first pixel disposed in the first region;

a second pixel disposed in the second region;

a first bias voltage line electrically connected to the first pixel to transmit a first bias voltage; and a second bias voltage line electrically connected to the second pixel to transmit a second bias voltage, wherein a time point, at which a level of the first bias voltage is changed, differs from a time point at which a level of the second bias voltage is changed, when the display panel operates at a first frame frequency.

2. The display device of claim 1, wherein the display panel operates a variable frame frequency including the first frame frequency and a second frame frequency higher than the first frame frequency.

3. The display device of claim 1, wherein one frame includes an active period, in which a data voltage is provided to each of the first pixel and the second pixel, and a plurality of blank periods provided consecutively to the active period, when the display panel operates at the first frame frequency.

4. The display device of claim 3, wherein the time point, at which the level of the first bias voltage is changed, is overlapped with the active period.

5. The display device of claim 3, wherein the time point, at which the level of the second bias voltage is changed, is overlapped with a boundary between the active period and the plurality of blank periods.

6. The display device of claim 1, wherein the first bias voltage and the second bias voltage are changed from a first level to a second level different from the first level, at the time point, at which the level of the first bias voltage is changed, and the time point at which the level of the second bias voltage is changed, respectively.

7. The display device of claim 6, wherein a period, in which the first bias voltage has the first level, is temporally in a non-overlap state with a period in which the second bias voltage has the first level.

8. The display device of claim 6, wherein the second level is higher than the first level.

9. The display device of claim 6, wherein the first level is higher than the second level.

10. The display device of claim 1, wherein a waveform of the first bias voltage is substantially the same as a waveform of the second bias voltage.

11. The display device of claim 1, wherein a phase of the first bias voltage differs from a phase of the second bias voltage.

12. The display device of claim 1, wherein each of the first pixel and the second pixel includes a light emitting element and a pixel circuit connected to the light emitting element, wherein the pixel circuit includes:

a first transistor including a gate electrode connected to a first node, a first electrode, and a second electrode connected to a second node, a second transistor connected between a data line and the first electrode of the first transistor, in which an operation of the second transistor is controlled by a write scan signal provided to a write scan line, and a third transistor connected between the first electrode of the first transistor and the first or second bias voltage line, in which an operation of the third transistor is controlled by a bias scan signal provided to a bias scan line connected to a gate electrode of the third transistor, and wherein the write scan signal is activated to be in an active level by X times, the bias scan signal is activated to be in an active level by Y times greater than the X times, X is a positive integer equal to or greater than 1, and Y is a positive integer equal to or greater than 2.

13. The display device of claim 12, wherein the pixel circuit further includes:

a fourth transistor connected between the first node and the second node, in which an operation of the fourth transistor is controlled by a compensation scan signal provided to a compensation scan line;

a fifth transistor connected between the first node and a first initialization voltage line for providing a first initialization voltage, in which an operation of the fifth transistor is controlled by an initialization scan signal provided to an initialization scan line;

a sixth transistor connected between the first electrode of the first transistor and a first driving voltage line for providing a first driving voltage, in which an operation of the sixth transistor is controlled by a light emitting control signal provided to a light emitting control line;

a seventh transistor connected between the second electrode of the first transistor and the light emitting element, in which an operation of the seventh transistor is controlled by the light emitting control signal provided to the light emitting control line; and an eighth transistor connected between the light emitting element and a second initialization voltage line for providing a second initialization voltage, in which an operation of the eighth transistor is controlled by the bias scan signal provided to the bias scan line.

14. The display device of claim 13, wherein each of the first transistor, the second transistor, the third transistor, the sixth transistor, the seventh transistor, and the eighth transistor is a P-type thin film transistor having a silicon semiconductor layer, and wherein each of the fourth transistor and the fifth transistor is an N-type thin film transistors having an oxide semiconductor layer.

15. A display device comprising:

a display panel configured to operate at a variable frame frequency including a first frame frequency and a second frame frequency higher than the first frame frequency, and including a plurality of first pixels electrically connected to a first bias voltage line and a plurality of second pixels electrically connected to a second bias voltage line; and a voltage generator configured to provide a first bias voltage to the first bias voltage line and provide a second bias voltage to the second bias voltage line, wherein each of the plurality of first pixels and second pixels includes:

a first transistor including a gate electrode connected to a first node, a first electrode, and a second electrode connected to a second node;

a second transistor connected between a data line and the first electrode of the first transistor, in which an operation of the second transistor is controlled by a write scan signal provided to a write scan line; and a third transistor connected between the first electrode of the first transistor and the first or second bias voltage line, in which an operation of the third transistor is controlled by a bias scan signal provided to a bias scan line connected to a gate electrode of the third transistor, and wherein the write scan signal is activated to be in an active level by X times, the bias scan signal is activated to be in an active level by Y times greater than the X times, X is a positive integer equal to or greater than 1, and Y is a positive integer equal to or greater than 2.

16. The display device of claim 15, wherein one frame includes an active period, in which a data voltage is provided to each of the first pixel and the second pixel, and a plurality of blank periods provided consecutively to the active period, when the display panel operates at the first frame frequency, wherein a time point, at which a level of the first bias voltage is changed, is overlapped with the active period, and wherein a time point, at which a level of the second bias voltage is changed, is overlapped with a boundary between the active period and the plurality of blank periods.

17. The display device of claim 15, wherein a phase of the first bias voltage differs from a phase of the second bias voltage.

18. The display device of claim 15, wherein the first bias voltage and the second bias voltage are changed from a first level to a second level different from the first level, at a time point, at which the level of the first bias voltage is changed, and a time point at which the level of the second bias voltage is changed, respectively.

19. The display device of claim 18, wherein a period, in which the first bias voltage has the first level, is temporally in a non-overlap state with a period in which the second bias voltage has the first level.

20. The display device of claim 15, wherein each of the plurality of first pixels and second pixels further includes a light emitting element and a pixel circuit connected to the light emitting element and including the first to third transistors, wherein the pixel circuit further includes:

a fourth transistor connected between the first node and the second node in which an operation of the fourth transistor is controlled by a compensation scan signal provided to a compensation scan line;

a fifth transistor connected between the first node and a first initialization voltage line for providing a first initialization voltage, in which an operation of the fifth transistor is controlled by an initialization scan signal provided to an initialization scan line;

a sixth transistor connected between the first electrode of the first transistor and a first driving voltage line for providing a first driving voltage, in which an operation of the sixth transistor is controlled by a light emitting control signal provided to a light emitting control line;

a seventh transistor connected between the second electrode of the first transistor and the light emitting element, in which an operation of the seventh transistor is controlled by the light emitting control signal provided to the light emitting control line; and an eighth transistor connected between the light emitting element and a second initialization voltage line for providing a second initialization voltage, in which an operation of the eighth transistor is controlled by the bias scan signal provided to the bias scan line.

* * * * *